United States Patent
Chue et al.

(10) Patent No.: US 6,657,801 B1
(45) Date of Patent: Dec. 2, 2003

(54) DISK DRIVE WITH IMPROVED CHARACTERIZATION SEGMENT PATTERN AND METHOD OF RECORDING THE SAME

(75) Inventors: Jack M. Chue, Los Altos, CA (US); William C. Tipton, II, Gilroy, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/262,484

(22) Filed: Sep. 30, 2002

(51) Int. Cl.[7] .............................. G11B 5/09; G11B 5/596
(52) U.S. Cl. ................... 360/48; 360/77.02; 360/77.01; 360/77.06; 360/77.08
(58) Field of Search ................... 360/48, 77.08, 360/77.02, 77.01, 77.06

(56) References Cited

U.S. PATENT DOCUMENTS

| | | | | |
|---|---|---|---|---|
| 5,905,603 A | * | 5/1999 | Ogasawara et al. | 360/77.08 |
| 6,091,559 A | * | 7/2000 | Emo et al. | 360/48 |
| 6,198,584 B1 | * | 3/2001 | Codilian et al. | 360/48 |
| 6,256,160 B1 | * | 7/2001 | Liikanen et al. | 360/48 |
| 6,404,576 B1 | * | 6/2002 | Hamaguchi et al. | 360/48 |

FOREIGN PATENT DOCUMENTS

WO    WO 02/27887 A1    4/2002

* cited by examiner

Primary Examiner—David Hudspeth
Assistant Examiner—Natalia Figueroa
(74) Attorney, Agent, or Firm—Milad G. Shara, Esq.; Myers Dawes Andras & Sherman

(57) ABSTRACT

A disk drive and related method, the disk drive including a rotating magnetic disk and read and write elements for reading and writing data from and to the rotating magnetic disk, comprising: a magnetic characterization pattern recorded on the rotating magnetic disk for use in characterizing widths of the read and write elements using a plurality of track profiles of differing width. The magnetic characterization pattern is uniquely formed from a first plurality of characterization segments of a first radial width disposed circumferentially about a full circumference track on the rotating magnetic disk and a second plurality of characterization segments of a second radial width that is different than the first radial width disposed circumferentially about the same full circumference track on the rotating magnetic disk. The beneficial result is that two measurements can be accomplished within the STW in roughly the same time it ordinarily takes to accomplish only one.

17 Claims, 6 Drawing Sheets

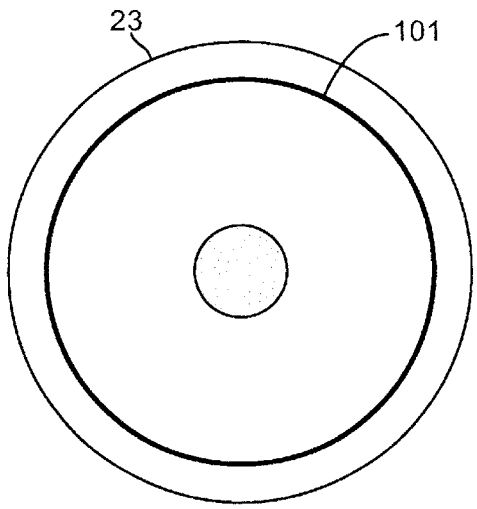
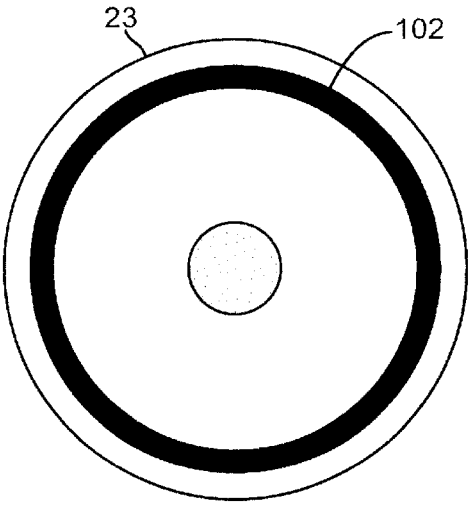
FIG. 3A
PRIOR ART
FIG. 3B
PRIOR ART
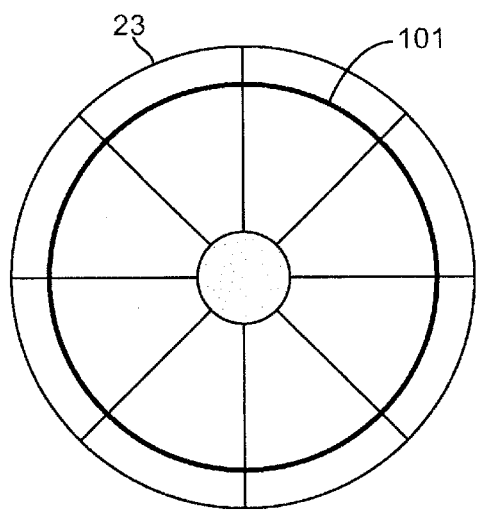
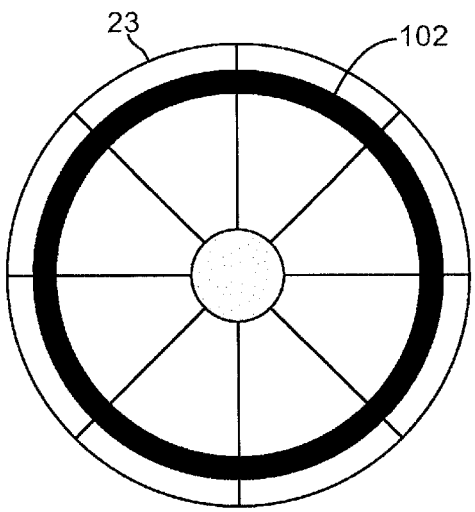
FIG. 4A
PRIOR ART
FIG. 4B
PRIOR ART

SINGLE WEDGE

MULTI WEDGE

DISK DRIVE WITH IMPROVED CHARACTERIZATION SEGMENT PATTERN AND METHOD OF RECORDING THE SAME

BACKGROUND OF THE INVENTION

1. Field of the Invention

The present invention relates generally to magnetic disk drives (disk drives), and more particularly to a disk drive with an improved characterization segment pattern that reduces the test time associated with multiple profile scans used to determine reader and writer magnetic widths, and to a method of recording such pattern.

2. Description of the Related Art

This application is directed to a disk drive 10 like that exemplified by FIG. 1. As shown, a conventional disk drive 10 has a head disk assembly (HDA) 20 housed within an enclosure formed from a base 21 and a cover 24. The HDA 20 includes at least one disk 23, a spindle motor 22 for rapidly rotating the disk 23, and a head stack assembly (HSA) 40 that includes an actuator assembly 50 and a head gimbal assembly (HGA) (not numbered) with a transducer head 80 for reading and writing data. The HSA 40 is part of a servo control system that positions the transducer head 80 over a particular track on the disk to read or write information from that track. The HSA 40 earns its name from the fact that it generally includes a plurality of HGAs that collectively provide a vertical arrangement of heads called a "head stack".

The industry presently prefers a "rotary" or "swing-type" actuator assembly 50 that conventionally comprises an actuator body 51 which rotates on a pivot assembly between limited positions, a coil 52 that extends from one side of the actuator body to interact with a pair of permanent magnets 60 to form a voice coil motor (VCM), and an actuator arm 54 that extends from the opposite side of the actuator body to support the HGA.

A controller circuit board 30 suitably positions the actuator assembly 50 and then reads or writes user data in accordance with commands from a host system (not shown).

A disk drive is ultimately used to store user data in one or more "data tracks" that are most commonly arranged as a plurality of concentric data tracks on the surface of its disk or disks. Special servo information is factory-recorded on at least one disk surface so that the disk drive's servo control system may control the actuator assembly 50, via the VCM, to accurately position the transducer head to read or write user data to or from the data tracks. In operation, the disk drive's servo control system processes (read only) the pre-recorded servo information while the disk drive processes (reads or writes) user data in the data tracks.

Earlier disk early drives used a "dedicated servo" system where one head and one disk surface provide the servo information for all of the other heads and disk surfaces. As shown in FIG. 2, however, the industry presently prefers an "embedded servo" system where the servo information is interspersed amongst the data on each surface of each disk. The factory-recorded servo information is contained in servo wedges 211 that are each divided into a plurality of servo sectors 511. The servo sectors 511 are recorded concentrically in order to provide numerous servo tracks formed from an entire rotation of servo sectors 511.

The servo information is factory recorded at the time of manufacture using a relatively expensive and low-throughput manufacturing fixture called a servo track writer (STW). The STW records the servo tracks containing the servo information on each surface of each disk for later use by the servo control system when the drive is in the hands of the user. The servo tracks are generally used throughout the life of the disk drive without modification. The operation of an STW is well known to those of ordinary skill in the art.

As shown, each servo wedge 211 generally comprises a header region HDR followed by a plurality of servo bursts (two are shown, but four is common). The header region HDR generally includes several fields (none of which are separately shown in FIG. 2) such as a setup or write splice field WRITE SPLICE, an address mark field AM, an automatic gain control/phase locked oscillator field AGC/PLO, a servo sync mark field SSM, a track identification field TKID, and a wedge number field W#. The header region HDR is followed by at least two servo bursts (an A burst and B burst are shown) that are circumferentially sequential and radially offset relative to a burst pair centerline. The servo format used is not critical and is explained here only for background purposes. The purpose of these various fields and available variations are well known to those of ordinary skill in the art.

Today, the transducer head 80 of FIG. 1 is usually provided in the form of a so-called magnetoresistive transducer that includes a separate reader and a separate writer. As the market continues to demand increased storage capacity and overall performance at reduced cost, the industry has steadily reduced the widths of the reader and writer in order to increase the track pitch and overall a real density of the disk drive. Due to normal manufacturing variations with respect to physical width, sensitivity and linearity, it has become more and more critical to characterize the reader width and writer width of individual transducers in order to optimize the capacity or performance of an individual drive and increase overall yield.

The conventional approach to characterizing the reader width is with a so-called "micro-track profile" that is enabled by writing a full-width track and then erasing a portion of that track to leave a continuous, partial width characterization track 101 to the surface of the disk 23, as suggested by FIG. 3A. In developing the micro-track profile, the reader is scanned radially across the partial width characterization track 101 to produce a series of signal amplitude data points that can be analyzed with conventional techniques to establish the reader width.

The conventional approach to characterizing the writer width is with a so-called "full-track profile" that is enabled by writing a continuous, full width characterization track 102 to the surface of the disk, as suggested by FIG. 3B. In developing the full-track profile, the reader is scanned radially across the full width characterization track 102 to produce a series of signal amplitude data points that can be analyzed with conventional techniques to establish the writer width.

The concepts of full-track and micro-track profiles are well known to those of ordinary skill in the art. It is also well known that the characterization takes an appreciable amount of time in the STW because the reader is successively moved to a plurality of different radial positions and, for each such position, the characterization track 101 or 102 is revolved beneath the reader for one full revolution so that the signal amplitude may be averaged over that one revolution in order to produce a track average amplitude or TAA for that particular position of the reader. The conventional process must be affected for the full-track profile and then separately affected for the micro-track profile.

FIGS. 4A and 4B are simplified illustrations of a conventional "sectorization" of the partial-width and full-width characterization tracks 101, 102 that provides improved accuracy in making track profile measurements. It still remains necessary, however, to take the time required to separately process the partial-width and full-width characterization tracks 101, 202.

U.S. Pat. No. 6,404,576 entitled "METHOD AND SYSTEM FOR COMPENSATION OF NONLINEARITY OR FLUCTUATION OF HEAD POSITION SIGNAL" (hereafter the "'576 Patent"), and issued Jun. 11, 2002, is an example of a method for obtaining the micro-track and full-track profiles in the field rather than in the STW. In the '576 Patent, using multiple passes in the STW, special patterns are written in a reserved areas of the disk before shipping so that after the disk drive is in the field, the disk drive can detect a full-track profile or a micro-track profile by locating the reader at a suitable radial position while rotating these special patterns beneath the reader and taking amplitude measurements.

In the '576 Patent, the patterns are written in the data sectors. Moreover, the pattern components are deviated from one another by being incrementally shifted radially inward across two track widths ("$2 \times T_p$") in a "stair step" fashion. FIG. 1 shows an example of this deviation in the context of a full-width pattern 51 used for detecting a full-track profile and FIG. 14 show an example in the context of a partial-width pattern 56 used for detecting a micro-track profile. The illustrated deviation of successive components provides patterns that are inherently "scanned" beneath the reader as the disk rotates since, in the field, it is impractical to accurately scan the reader over a continuous, partial or full-width track 101 or 102 like that show in FIGS. 3A and 3B as is possible while the drive is in the STW.

The '576 Patent, in other words, is not directed to characterizing reader and writer widths while the drive is in the STW, but rather to enabling such characterizations after the drive leaves the STW. Moreover, although the pattern 51 of the '576 Patent may be used to detect a full-track profile with one revolution of the disk and although the pattern 56 may be used to detect a micro-track profile with another revolution of the disk, many revolutions are still necessary to record such patterns 51, 56 while the disk drive is in the STW. The '576 Patent was not directed to achieving efficiencies in the STW. Time is of the essence while drives are in the STW because they are very expensive machines that represent a significant bottleneck in the manufacturing process.

There remains a need for a disk drive with a more efficient pattern of characterization segments.

SUMMARY OF INVENTION

The invention may be regarded as a hard disk drive including a rotating magnetic disk and read and write elements for reading and writing data from and to the rotating magnetic disk, comprising: a magnetic characterization pattern recorded on the rotating magnetic disk for use in characterizing widths of the read and write elements using a plurality of track profiles of differing width, the magnetic characterization pattern comprising: a first plurality of characterization segments of a first radial width disposed circumferentially about a full circumference track on the rotating magnetic disk; and a second plurality of characterization segments of a second radial width that is different than the first radial width disposed circumferentially about the same full circumference track on the rotating magnetic disk.

In a more specific context, the first radial width of the first plurality of characterization segments is a fraction of the read element's width for use in characterizing a micro track profile and the second radial width of the second plurality of characterization segments is equal to the write element's width for use in characterizing a full track profile.

The first and second plurality of characterization segments can be arranged in a variety of locations on the full circumference track. In one embodiment, the full circumference track includes a plurality of servo sectors that each contain first and second servo burst fields and the first and second plurality of characterization segments are disposed in the servo burst fields.

The first and second plurality of characterization segments can also be arranged in a variety of desired patterns on the full circumference track. In one embodiment, the first and second plurality of characterization segments are disposed in an alternating fashion about the full circumference track on the rotating magnetic disk. In another embodiment, the first plurality of characterization segments are disposed in a first half revolution of the full circumference track and the second plurality of characterization segments are disposed in a second half revolution of the full circumference track.

The invention may also be regarded as a method of recording a pattern of characterization segments on a hard disk drive including a rotating magnetic disk and read and write elements for reading and writing data from and to the rotating magnetic disk, wherein the characterization segments are adapted for use in characterizing widths of the read and write elements, the method comprising: recording a first plurality of characterization segments that are disposed circumferentially about portions of a full circumference track on the rotating magnetic disk, the first plurality of characterization segments being of a first radial width; and recording a second plurality of characterization segments that are disposed circumferentially about other portions of the same full circumference track on the rotating magnetic disk, the second plurality of characterization segments being of a second radial width that is different than the first radial width.

BRIEF DESCRIPTION OF THE DRAWINGS

The just summarized invention may best be understood with reference to the Figures of which:

FIG. 3A is a simplified representation of a conventional, continuous, partial width characterization track 101 that is recorded on the surface of the disk 23 for use in developing a micro-track profile that is representative of the reader width while the disk drive 10 is in the STW;

FIG. 3B is a simplified representation of a conventional, continuous, full width characterization track 102 that is recorded on the surface of the disk 23 for use in developing a full-track profile that is representative of the writer width while the disk drive 10 is in the STW;

FIGS. 4A and 4B are a simplified representation of conventional "sectorization" that permits enhanced processing of the signal amplitude data developed when reading the micro-partial width and full width characterization tracks 101, 102 of FIGS. 3A and 3B;

DETAILED DESCRIPTION OF THE PREFERRED EMBODIMENT

This patent application is directed to a disk drive 10 that includes a rotating magnetic disk 23 and read and write elements for reading and writing data from and to the rotating magnetic disk. In more detail, the disk drive 10 uniquely contains a magnetic characterization pattern 300 recorded on the rotating magnetic disk 23 for use in characterizing widths of the read and write elements using a plurality of track profiles of differing width. In even more detail, the magnetic characterization pattern 300 comprises a first plurality of characterization segments of a first radial width disposed circumferentially about a full circumference track 301 on the rotating magnetic disk 23 and a second plurality of characterization segments of a second radial width that is different than the first radial width disposed circumferentially about the same full circumference track 301 on the rotating magnetic disk 23.

FIGS. 5 to 9 illustrate several of many possible embodiments of the invention in the context of a full circumference track 301 on the surface of a disk 23. The disk 23 is shown with only eight servo sectors for simplicity's sake, but it should be understood that the actual number of sectors may be in the neighborhood of 100 or more.

In all of the illustrated embodiments, the first characterization segments "M" have a first width that is suitable for establishing a micro-track profile and the second characterization segments "F" have a second width that is suitable for establishing a full-track profile. In other words, the first radial width of the first plurality of characterization segments "M" is a fraction of the read element's width for use in characterizing a micro track profile and the second radial width of the second plurality of characterization segments "F" is equal to the write element's width for use in characterizing a full track profile.

Figure 5:
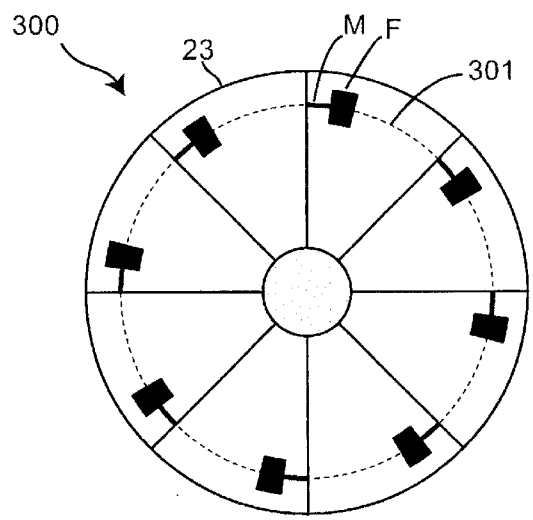
FIG. 5 shows a first preferred embodiment where the first and second plurality of characterization segments "M" and "F" are disposed in an alternating fashion about the full circumference track on the rotating magnetic disk.
Figure 6:
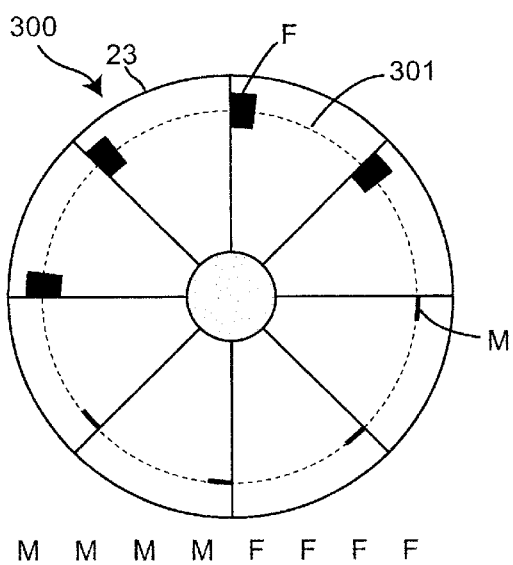
FIG. 6 shows a second preferred embodiment where the first and second plurality of characterization segments "M" and "F" are disposed in a first half revolution of the full circumference track 301 and the second plurality of characterization segments "F" are disposed in a second half revolution of the full circumference track 301.
Figure 7:
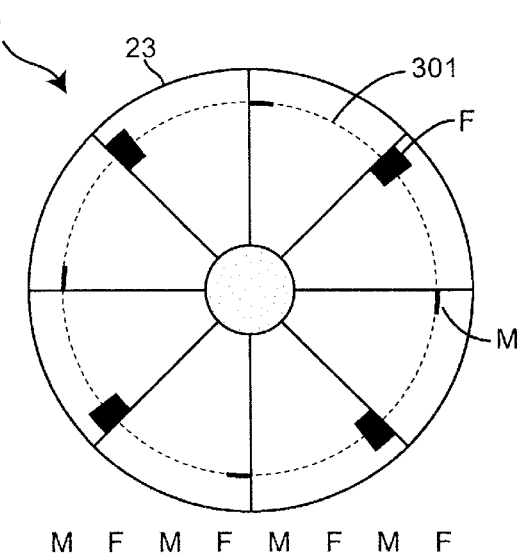
FIG. 7 shows an embodiment where the first plurality of characterization segments "M" are disposed in a servo burst field within odd(even) numbered ones of the servo sectors 211 and the second plurality of characterization segments "F" are disposed in a servo burst field within even(odd) numbered ones of the servo sectors 211.

FIGS. 5 to 7 relate to embodiments where wherein the full circumference track includes a plurality of servo sectors that each contain first and second servo burst fields and wherein the characterization segments "M" and "F" are disposed in servo burst fields (as further discussed below with reference to FIGS. 11 and 12). The characterization segments are preferably located in the servo burst fields because the read channel (not shown) is fully capable of measuring the amplitude of magnetic transitions located in these fields.

The foregoing embodiments make it uniquely possible to perform multiple measurements during a single revolution of the disk 23. The time required to characterize the reader and writer width while the disk drive is in the STW, therefore, is reduced by about one half.

Figure 1:
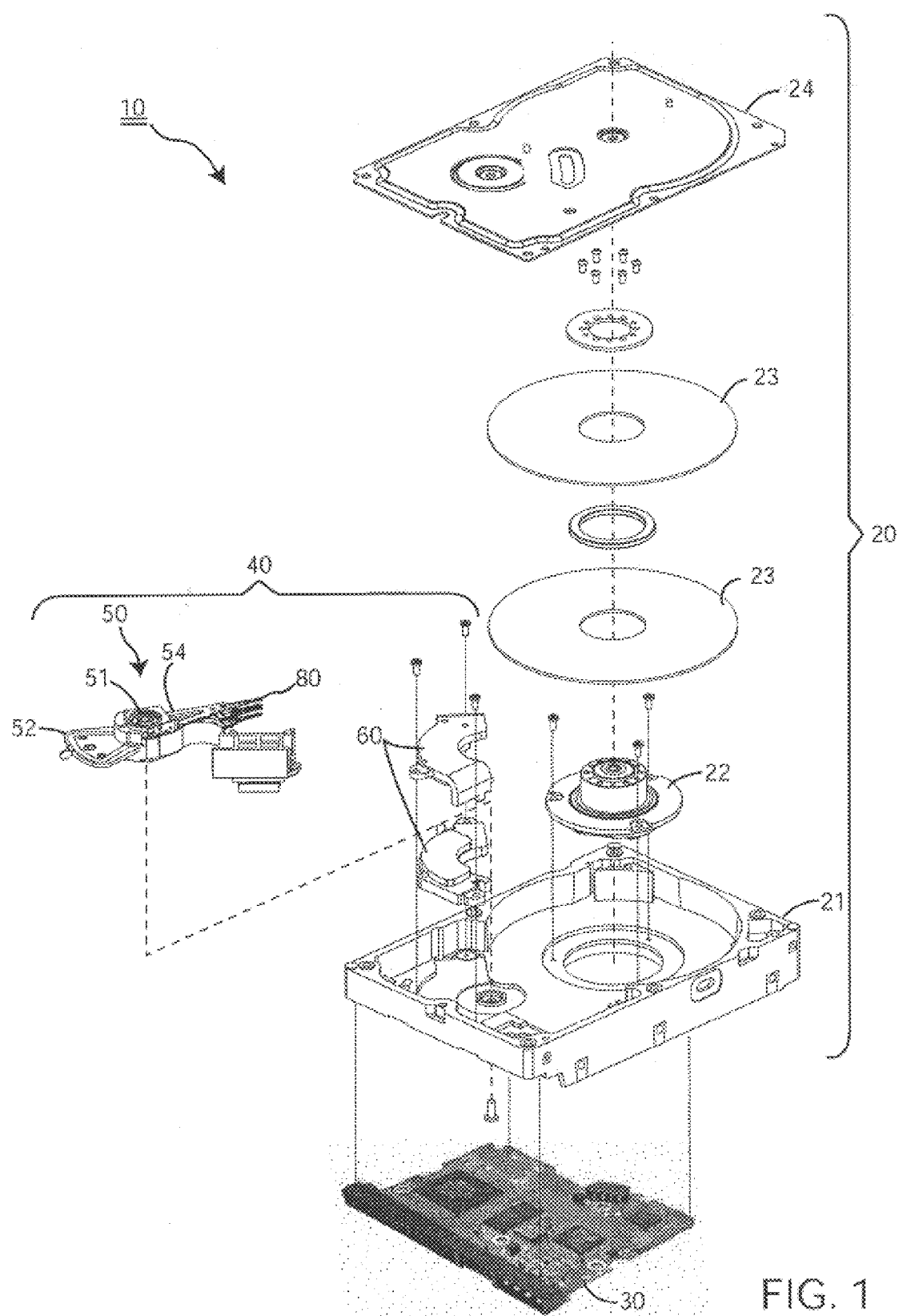
FIG. 1 is an exploded perspective view of a magnetic disk drive 10 having a head disk assembly 20 ("HDA") including a head stack assembly 40 ("HSA") which carries a transducer 80 over concentric data tracks and associated servo bursts on the surface of a disk 23.
Figure 2:
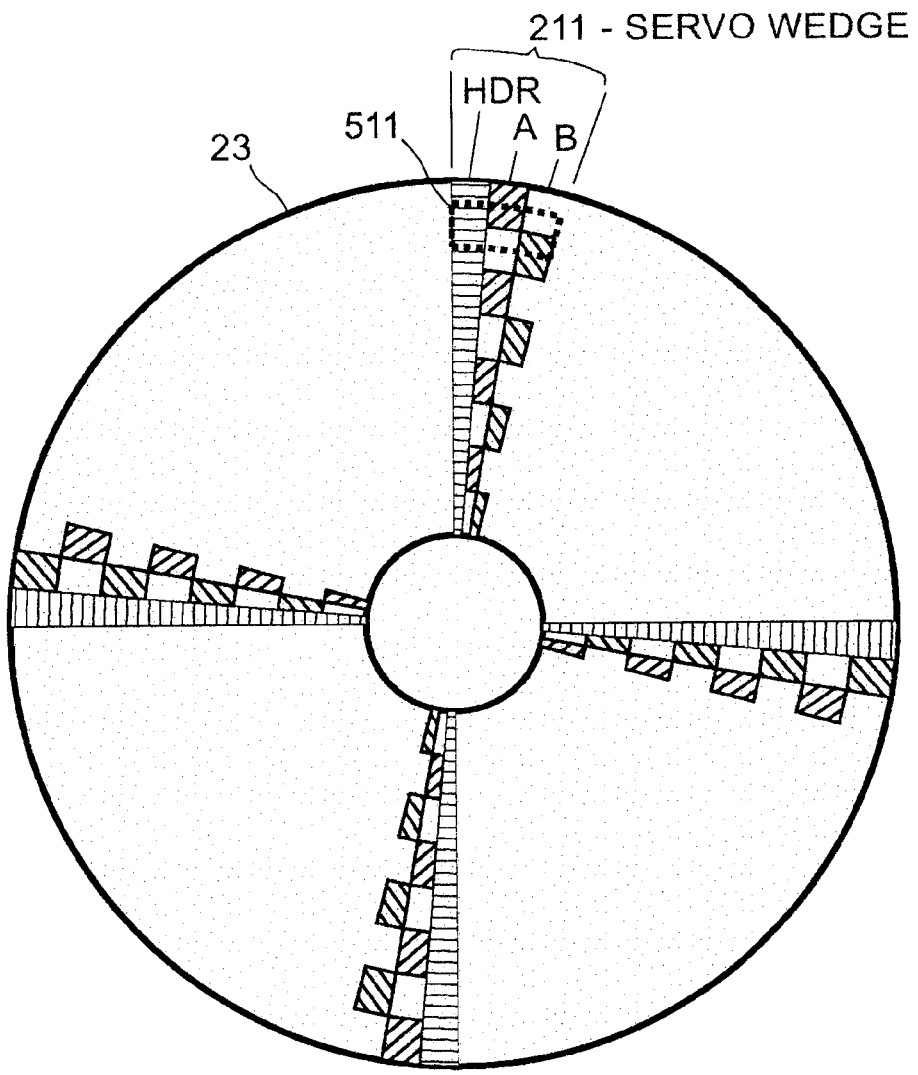
FIG. 2 is a simplified representation of an "embedded servo" pattern where the servo information is interspersed amongst the data on each surface of each disk 23.

FIG. 5 shows a first preferred embodiment where the first and second plurality of characterization segments "M" and "F" are disposed in an alternating fashion about the full circumference track on the rotating magnetic disk. The resulting pattern can be regarded as M/F M/F M/F M/F M/F M/F M/F M/F M/F. This embodiment is advantageous in that a first characterization segment "M" and a second characterization segment "F" are co-located in the same servo wedge 211 (see FIG. 2) such that they both experience the same run-out and flying height.

Figure 11:
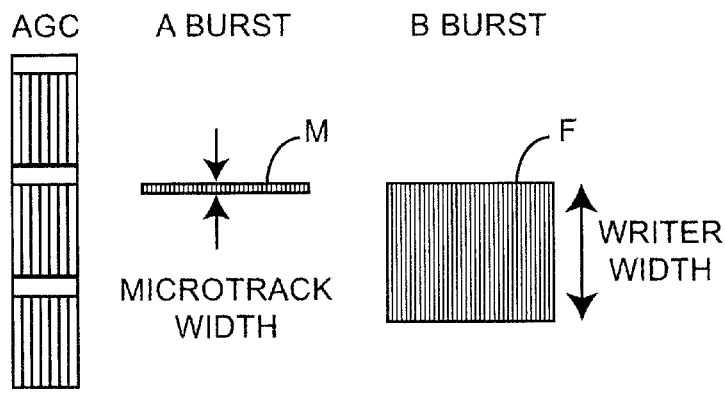
FIG. 11 is a simplified, close-up view of a single servo wedge wherein a pair of characterization segments "M" and "F" are disposed in successive servo burst fields A and B to produce the arrangement of FIG. 5.
Figure 12:
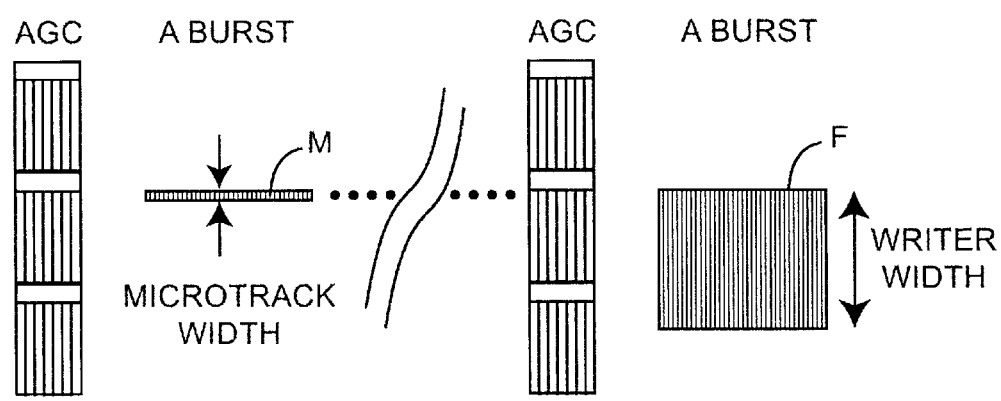
FIG. 12 is a simplified, close-up view of a plurality of servo wedges wherein characterization segments "M" and "F" are disposed in the A Burst servo burst field of successive servo sectors to produce the arrangement of FIGS. 6 and 7.

As shown in more detail in the "Single Wedge" illustration FIG. 11, each pair of characterization segments "M" and "F" are disposed in successive servo burst fields A and B. The "M" segment is in the A burst field and the "F" segment is in the B burst field as shown, or vice verse. In other words, each of the first and second plurality of characterization segments "M" and "F" is disposed in the first and second servo burst fields "A" and "B", respectively, of each servo sector. FIG. 11 identifies an automatic gain control field AGC. The illustrated AGC field, however, may or may not be one of several fields usually found in the header field HDR of a servo wedge 211 (see FIG. 2) In other words, the AGC field may be located where traditionally found in a servo header HDR, with or without other HDR fields or, as presently preferred, it may be separately written other than where traditionally written, and without other HDR fields, in order to create a "pseudo burst".

In using the segments, it is of course necessary to locate them. It is possible to use the disk drive's inherent servo processing ability to identify the location of the characterization segments "M" and "F". In the preferred embodiment, however, the characterization is accomplished while the disk drive is still in the STW and the characterization segments "M" and "F" are located through the use of conventional STW indexing. The characterization segments are still preferably located in the servo burst fields, however, so that the measurements of the amplitudes associated with the characterization segments may be accomplished with the read channel.

FIG. 6 show a second preferred embodiment where the first and second plurality of characterization segments "M" and "F" are also disposed in servo burst fields. Here, however, the first characterization segments "M" are disposed in a first half revolution of the full circumference track 301 and the second plurality of characterization segments "F" are disposed in a second half revolution of the full circumference track 301. In the context of the simplified eight-sector disk 23, the pattern can be regarded as M M M M F F F F. This embodiment is advantageous in that all of the characterization segments "M" used for micro-track measurements are in direct succession. In this embodiment, as shown in more detail in the "Multi Wedge" illustration of FIG. 12, all of the first and second characterization segments "M" and "F" are disposed in A burst fields, but in different servo wedges 211 (see FIG. 2).

FIG. 7 shows an embodiment wherein the full circumference track 301 includes a plurality of servo sectors 211 (see FIG. 2) that each comprise a plurality of servo burst fields (e.g. an A Burst and a Burst) and wherein the first plurality of characterization segments "M" are disposed in a servo burst field within odd(even) numbered ones of the servo sectors 211 and the second plurality of characterization segments "F" are disposed in a servo burst field within even(odd) numbered ones of the servo sectors 211. In the context of the simplified eight-sector disk 23, the pattern can be regarded as M F M F M F M F.

Figure 8:
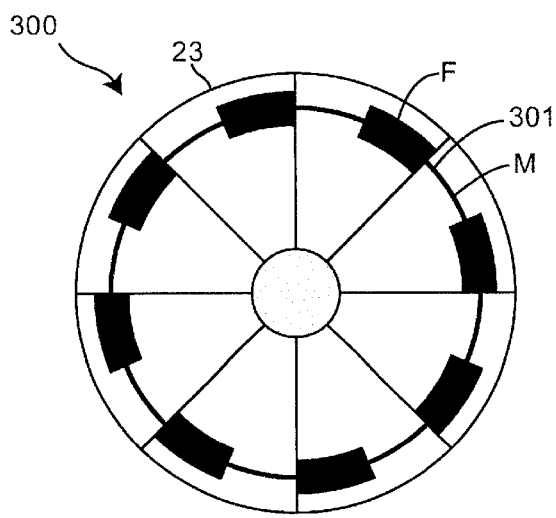
FIGS. 8 to 10 illustrate embodiments where the first and second characterization segments "M" and "F" are not constrained to the servo burst fields.
Figure 9:
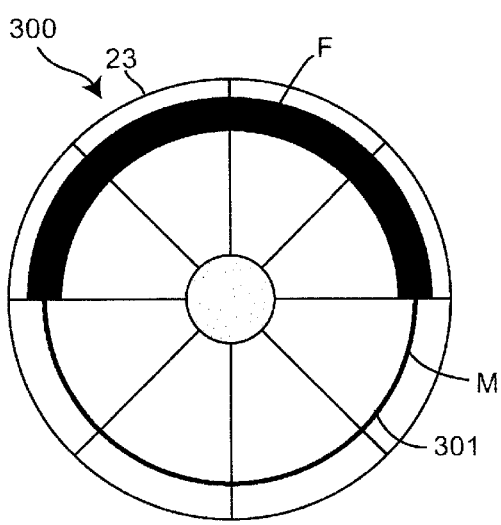
Figure 10:
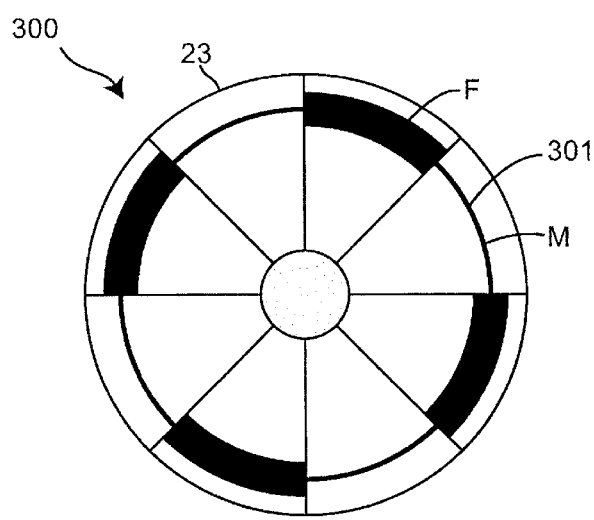

FIGS. 8 to 10 illustrate more general embodiments where the characterization segments "M" and "F" are not constrained to the servo burst fields, but rather may be disposed in any suitable location such as in user data regions, alone or in combination with the servo burst fields. FIGS. 8 to 10 correspond roughly to FIGS. 5 to 7, however, in terms of the pattern formed by the first and second characterization segments "M" and "F".

It should be understood that while the foregoing embodiments have focused on first and second characterization segments, it may be desirable to use more than two and that regardless of the number of different widths used, the width of the characterization segments may be provided in different widths other than those traditionally associated with making partial-track and full-track measurements.

We claim:

1. A hard disk drive including a rotating magnetic disk and read and write elements for reading and writing data from and to the rotating magnetic disk, comprising:
    a magnetic characterization pattern recorded on the rotating magnetic disk for use in characterizing widths of the read and write elements using a plurality of track profiles of differing width, the magnetic characterization pattern comprising:
        a first plurality of characterization segments of a first radial width disposed circumferentially about a full circumference track on the rotating magnetic disk; and
        a second plurality of characterization segments of a second radial width that is different than the first radial width disposed circumferentially about the same full circumference track on the rotating magnetic disk.

2. The hard disk drive of claim 1 wherein the first radial width of the first plurality of characterization segments is a fraction of the read element's width for use in characterizing a micro track profile.

3. The hard disk drive of claim 1 wherein the second radial width of the second plurality of characterization segments is equal to the write element's width for use in characterizing a full track profile.

4. The hard disk drive of claim 1 wherein the first and second plurality of characterization segments are disposed in an alternating fashion about the full circumference track on the rotating magnetic disk.

5. The hard disk drive of claim 4 wherein the full circumference track includes a plurality of servo sectors that each comprise a plurality of servo burst fields and wherein the first plurality of characterization segments are disposed in a servo burst field within odd(even) numbered ones of the servo sectors and the second plurality of characterization segments are disposed in a servo burst field within even (odd) numbered ones of the servo sectors.

6. The hard disk drive of claim 1 wherein the full circumference track includes a plurality of servo sectors that each contain first and second servo burst fields and wherein the first and second plurality of characterization segments are disposed in the servo burst fields.

7. The hard disk drive of claim 6 wherein one each of the first and second plurality of characterization segments is disposed in the first and second servo burst fields, respectively, of each servo sector.

8. The hard disk drive of claim 1 wherein the first plurality of characterization segments are disposed in a first half revolution of the full circumference track and wherein the second plurality of characterization segments are disposed in a second half revolution of the full circumference track.

9. A method of recording a pattern of characterization segments on a hard disk drive including a rotating magnetic disk and read and write elements for reading and writing data from and to the rotating magnetic disk, wherein the characterization segments are adapted for use in characterizing widths of the read and write elements, the method comprising:
    recording a first plurality of characterization segments that are disposed circumferentially about portions of a full circumference track on the rotating magnetic disk, the first plurality of characterization segments being of a first radial width; and
    recording a second plurality of characterization segments that are disposed circumferentially about other portions of the same full circumference track on the rotating magnetic disk, the second plurality of characterization segments being of a second radial width that is different than the first radial width.

10. The method of claim 9 wherein the first radial width of the first plurality of characterization segments is a fraction of the read element's width for use in characterizing a micro track profile.

11. The method of claim 9 wherein the second radial width of the second plurality of characterization segments is equal to the write element's width for use in characterizing a full track profile.

12. The method of claim 9 wherein the recording steps are accomplished to provide first and second plurality of characterization segments that are disposed in an alternating fashion about the full circumference track on the rotating magnetic disk.

13. The method of claim 12 wherein the full circumference track includes a plurality of servo sectors that each comprise a plurality of servo burst fields and wherein the step of recording the first plurality of characterization segments disposes the first plurality of characterization segments in a servo burst field within odd(even) numbered ones of the servo sectors and wherein the step of recording the second plurality of characterization segments disposes the second plurality of characterization segments in a servo burst field within even(odd) numbered ones of the servo sectors.

14. The method of claim 9 wherein the full circumference track includes a plurality of servo sectors that each contain first and second servo burst fields and wherein the steps of recording the first and second plurality of characterization segments disposes those segments in the servo burst fields.

15. The method of claim 14 wherein the recording steps dispose one each of the first and second plurality of characterization segments in the first and second servo burst fields, respectively, of each servo sector.

16. The method of claim 9 wherein the step of recording the first plurality of characterization segments disposes the first plurality of characterization segments in a first half revolution of the full circumference track and wherein the step of recording the second plurality of characterization segments disposes the second plurality of characterization segments are disposed in a second half revolution of the full circumference track.

17. The method of claim 9 wherein the recording steps are accomplished while the disk drive is in an STW.

* * * * *